(12) United States Patent
Morrissey et al.

(10) Patent No.: US 9,470,508 B2
(45) Date of Patent: Oct. 18, 2016

(54) NON-CONTACT COORDINATE MEASURING SYSTEM

(71) Applicant: General Electric Company, Schenectady, NY (US)

(72) Inventors: Sean Christopher Morrissey, Ballston Spa, NY (US); Eric Steven Buskirk, Scotia, NY (US); Michael Andrew Dagostino, Sr., Schenectady, NY (US); Robert Charles Malison, Jr., Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 27 days.

(21) Appl. No.: 14/259,378

(22) Filed: Apr. 23, 2014

(65) Prior Publication Data

US 2015/0308813 A1    Oct. 29, 2015

(51) Int. Cl.
*G01B 11/00* (2006.01)
*G01B 11/24* (2006.01)

(52) U.S. Cl.
CPC ............. *G01B 11/005* (2013.01); *G01B 11/24* (2013.01)

(58) Field of Classification Search
CPC ... G01B 11/2441; G01B 11/25; G01B 11/24; G01B 11/005
USPC ................................................. 356/601, 612
See application file for complete search history.

(56) References Cited

U.S. PATENT DOCUMENTS

| 2,645,971 | A  | * | 7/1953  | Herbst     | 356/601 |
|-----------|----|---|---------|------------|---------|
| 4,657,394 | A  | * | 4/1987  | Halioua    | 356/604 |
| 4,983,043 | A  | * | 1/1991  | Harding    | 356/606 |
| 5,444,536 | A  | * | 8/1995  | Satzger    | G01B 11/2545 356/613 |
| 5,871,391 | A  | * | 2/1999  | Pryor      | 451/9   |
| 6,441,908 | B1 | * | 8/2002  | Johnston et al. | 356/602 |
| 6,825,922 | B2 |   | 11/2004 | Johnston et al. | |
| 7,305,118 | B2 | * | 12/2007 | Leboeuf    | G01B 11/285 382/152 |
| 2003/0223082 | A1 | * | 12/2003 | Trantow et al. | 356/601 |
| 2008/0049235 | A1 | * | 2/2008  | Crowther   | 356/601 |
| 2009/0051938 | A1 | * | 2/2009  | Miousset   | G01B 11/245 356/625 |
| 2012/0293789 | A1 | * | 11/2012 | Nygaard    | B07C 5/342 356/51 |

* cited by examiner

*Primary Examiner* — Kara E Geisel
*Assistant Examiner* — Dominic J Bologna
(74) *Attorney, Agent, or Firm* — Ernest G. Cusick; Hoffman Warnick LLC

(57) ABSTRACT

Aspects of the present disclosure relate generally to non-contact coordinate measuring systems, apparatuses, and methods. An apparatus according to the present disclosure can include a laser assembly slidably coupled to a track and configured to emit a first laser beam onto an exterior surface of a component, wherein the track is coupled to a machine for manufacturing the component; a laser encoder configured to detect the first laser beam emitted from the laser assembly and reflected from the exterior surface of the component; and a computer system coupled to the laser encoder and configured to render a geometric profile of the exterior surface of the component based on the first laser beam detected with the laser encoder.

19 Claims, 8 Drawing Sheets

NON-CONTACT COORDINATE MEASURING SYSTEM

BACKGROUND OF THE INVENTION

The subject matter disclosed herein relates to the coordinate measuring of manufactured components, such as turbine wheel dovetail protrusions. More specifically, the present disclosure relates to a non-contact coordinate measuring system, including related apparatuses and program products.

Many manufactured components by design include complex exterior profiles. In one example, turbine wheels can include dovetail protrusions which matingly engage corresponding dovetail slots located on individual turbine blades or buckets. The surfaces of the dovetail regions can include multiple regions of contact with complex curvatures. Before deploying a mechanical component such as a turbine wheel, a manufacturer and/or customer may test a newly manufactured component to determine whether the component meets quality standards. One device for examining the exterior profile of a manufactured component is a coordinate measuring machine (CMM). Typical gauges include contact-based tools for examining the exterior profile of a component.

BRIEF DESCRIPTION OF THE INVENTION

At least one embodiment of the present disclosure is described herein with reference to non-contact coordinate measuring systems. However, it should be apparent to those skilled in the art and guided by the teachings herein that embodiments of the present invention are applicable to measuring and/or modeling the exterior profile of any currently known or later developed mechanical component.

A first aspect of the present disclosure provides an apparatus. The apparatus can include: a laser assembly slidably coupled to a track and configured to emit a first laser beam onto an exterior surface of a component, wherein the track is coupled to one of the component and a machine for manufacturing the component; a positional encoder configured to detect the position of the laser assembly; a laser encoder configured to detect the first laser beam emitted from the laser assembly and reflected from the exterior surface of the component; and a computer system coupled to the laser encoder and the positional encoder configured to render a geometric profile of the exterior surface of the component based on the position of the laser assembly and the first laser beam detected with the laser encoder.

A second aspect of the present disclosure provides a program product stored on a computer readable storage device, the program product operative to measure coordinates when executed. The computer readable storage device can include program code for: deriving spatial coordinate data from positional encoder data and detected laser beams, the detected laser beams having been reflected from an exterior surface of a component and emitted from a slidably moveable source coupled to one of the component and a machine for manufacturing the component and; modeling a geometric profile of the exterior surface of the component based on the derived spatial coordinate data; and rendering the modeled geometric profile.

A third aspect of the present disclosure provides a system. The system can include a laser assembly slidably coupled to a track and configured to direct a laser beam onto an exterior surface of a component, wherein the track is coupled to one of the component and a machine for manufacturing the component; a positional encoder configured to detect the position of the laser assembly; a laser encoder configured to detect the laser beam directed from the laser assembly and reflected from the exterior surface of the component; and a computer system coupled to the laser encoder and positional encoder and configured to render a geometric profile of the exterior surface of the component based on the position of the laser assembly and the laser beam detected with the laser encoder by performing actions including: deriving spatial coordinate data from the detected laser beam, the detected laser beam having been reflected from the exterior surface of the component; modeling a geometric profile of the exterior surface of the component based on the derived spatial coordinate data and the detected position of the laser assembly; and rendering the modeled geometric profile.

BRIEF DESCRIPTION OF THE DRAWING

These and other features of the disclosed apparatuses will be more readily understood from the following detailed description of the various aspects of the apparatus taken in conjunction with the accompanying drawings that depict various embodiments of the invention, in which.

It is noted that the drawings are not necessarily to scale. The drawings are intended to depict only typical aspects of the disclosure, and therefore should not be considered as limiting its scope. In the drawings, like numbering represents like elements between the drawings.

DETAILED DESCRIPTION OF THE INVENTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely exemplary.

Embodiments of the present disclosure include a system, apparatus, and program product for non-contact coordinate measuring. As used herein, a "system" can include the combination of an apparatus and a program product according to embodiments of the present disclosure. Technical effects of the systems, methods, and apparatuses described herein include modeling the geometric profile of a particular component, such as a dovetail protrusion from a turbine wheel, without contacting the component.

Figure 1:
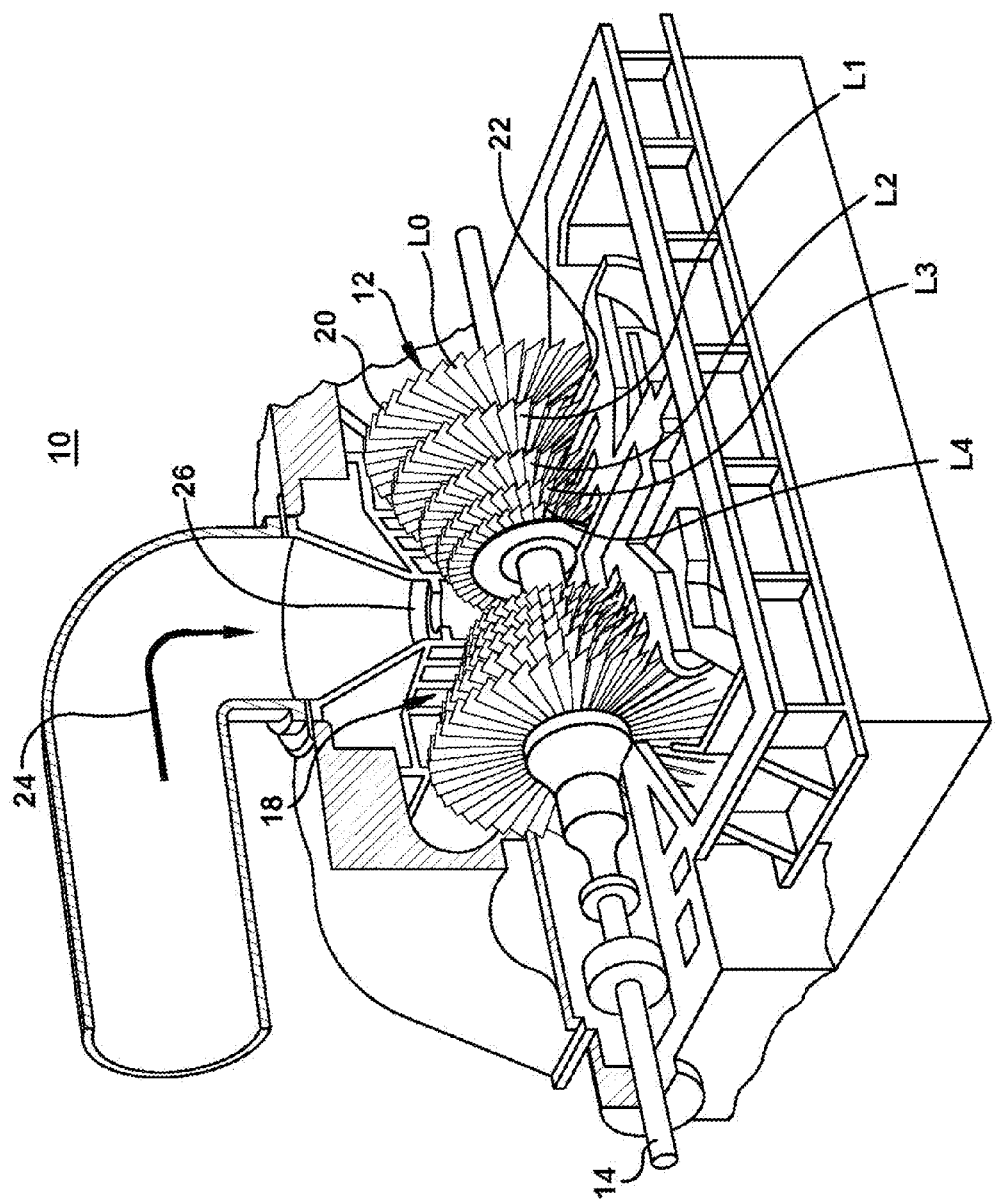
FIG. 1 is a perspective partial cut-away illustration of a conventional steam turbine.

Referring to the drawings, FIG. 1 shows a perspective partial cut-away illustration of a conventional steam turbine 10 included as an example of a turbomachine. Steam turbine 10 includes a rotor 12 that includes a shaft 14 and a plurality of axially spaced rotor wheels 18. A plurality of rotating blades 20 are mechanically coupled to each rotor wheel 18. More specifically, blades 20 are arranged in rows that extend circumferentially around each rotor wheel 18. A plurality of stationary vanes 22 extend circumferentially around shaft 14 and are axially positioned between adjacent rows of blades 20. Stationary vanes 22 cooperate with blades 20 to form a turbine stage and define a portion of a steam flow path through turbine 10.

In operation, steam 24 enters an inlet 26 of turbine 10 and is channeled through stationary vanes 22. Vanes 22 direct steam 24 downstream against blades 20. Steam 24 passes through the remaining stages imparting a force on blades 20 causing shaft 14 to rotate. At least one end of turbine 10 may extend axially away from rotor 12 and may be attached to a load or machinery (not shown) such as, but not limited to, a generator, and/or another turbine. Accordingly, a large steam turbine unit may actually include several turbines each co-axially coupled to the same shaft 14. Such a unit may, for example, include a high pressure section coupled to an intermediate-pressure section, which in turn is coupled to a low pressure section.

In one embodiment of the present invention and shown in FIG. 1, turbine 10 can comprise five stages referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and a section of a turbine (e.g., a low pressure section) can have more or less than five stages.

Figure 2:
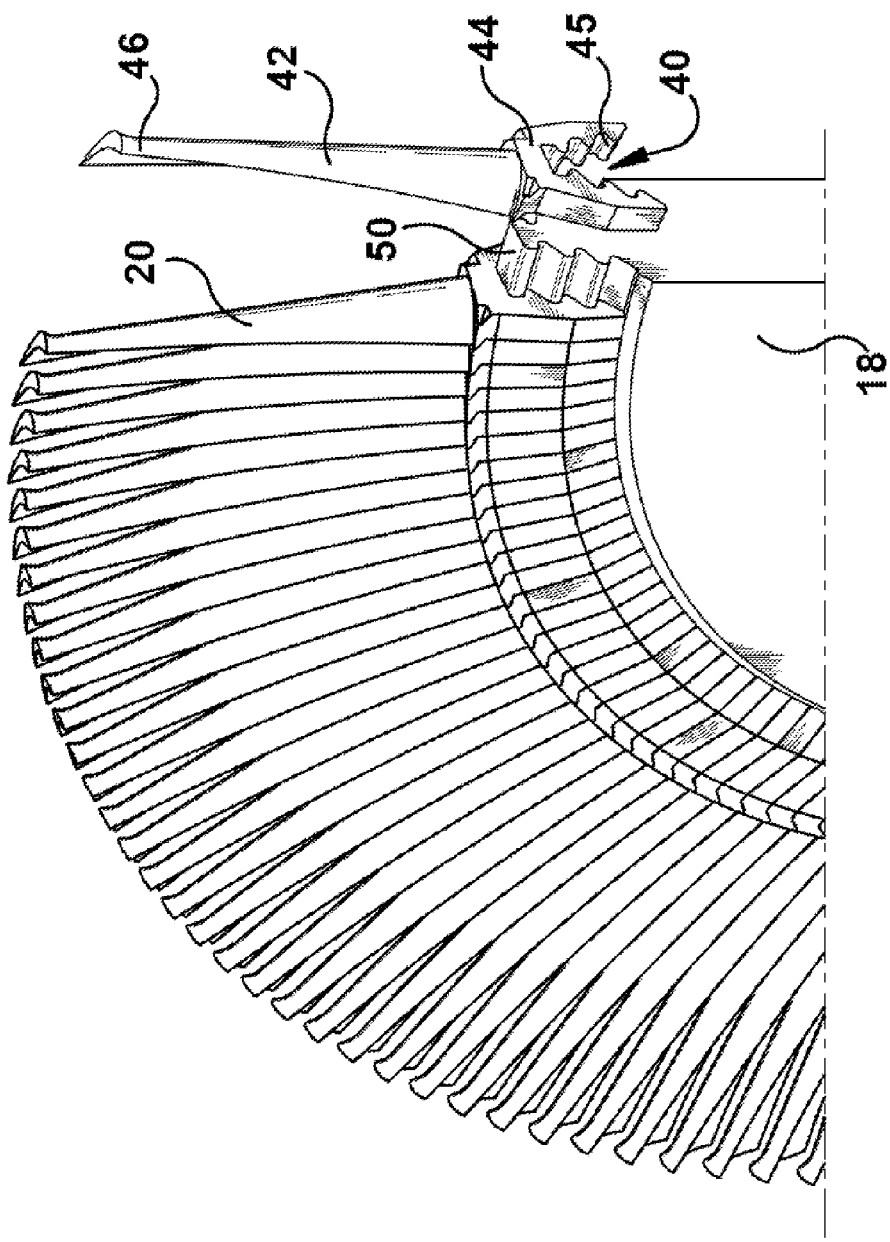
FIG. 2 is a perspective illustration of a conventional dovetail connection between a steam turbine blade and wheel.

A conventional design for connecting wheel 18 and blades 20 in steam turbine 10 (FIG. 1), is shown in FIG. 2. This design can be referred to as a tangential entry dovetail connection because blades 20 can be inserted into the connection in a substantially tangential direction. In other words, blades 20 are slid onto wheel 18 along a circumference of wheel 18. FIG. 2 shows a perspective illustration of this tangential entry dovetail connection between rotating blades 20 and wheel 18. Each blade 20 is formed with a dovetail slot 40, an airfoil portion 42, and a root section 44 extending therebetween. Airfoil portion 42 extends radially outward from root section 44 to a tip section 46. In one known embodiment, dovetail slot 40, airfoil portion 42, root section 44 and tip section 46 are all fabricated as a unitary component.

Blades 20 are coupled to turbine rotor wheel 18 via dovetail slot 40 and extend radially outward from rotor wheel 18. Wheel 18 includes a corresponding dovetail protrusion 50 which matingly engages with dovetail slots 40 of each blade 20. Dovetail slots 40 and dovetail protrusion 50 provide a tangential entry dovetail connection to secure wheel 18 to blades 20. Dovetail slots 40 each include at least one contact surface 45. Contact surfaces 45 refer to the surfaces of dovetail slots 40 that contact each other when dovetail slots 40 and dovetail protrusion 50 are matingly engaged.

Figure 3:
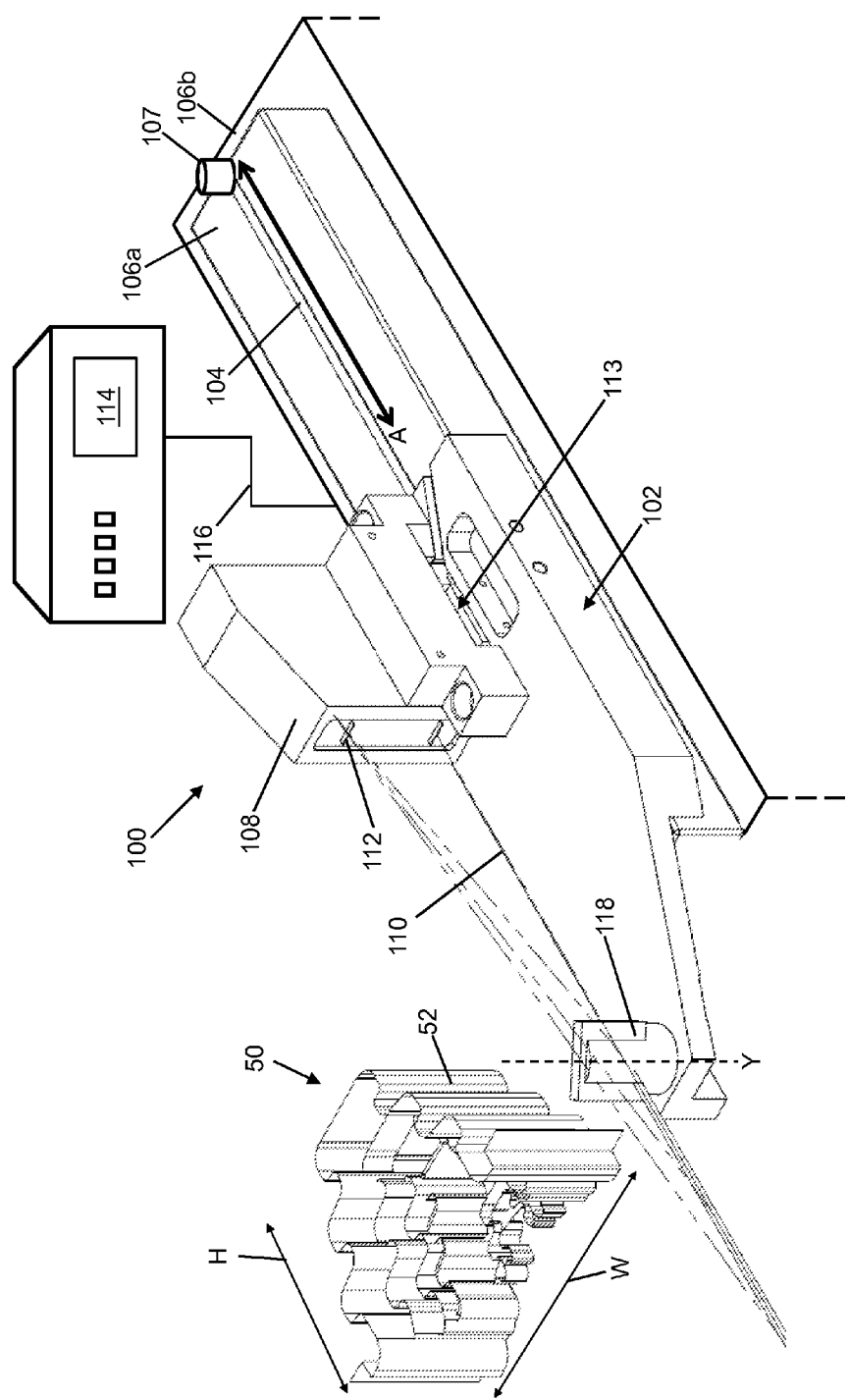
FIG. 3 is a perspective illustration of an apparatus according to an embodiment of the present disclosure.

Turning to FIG. 3, embodiments of the present disclosure include an apparatus of a non-contact coordinate measuring system. An example apparatus 100 according to the present disclosure is shown with dovetail protrusion 50 for the purposes of illustration only; embodiments of the present disclosure can be adapted for measuring other components, e.g., a bucket dovetail protrusion, a horizontal joint surface of critical flatness, a generator rotor, and/or other components of machines used in a larger assembly such as turbine 10 (FIG. 1). The same embodiment of apparatus 100 can be used to measure several types of components without being modified. Dovetail protrusion 50 can be interchanged with other components to be measured and/or modeled. Embodiments of apparatus 100 can be used during and/or after a component such as dovetail protrusion 50 is manufactured, depending on the particular implementation.

Apparatus 100 can include a laser assembly 102 mounted on and slidably coupled to a track 104 located on a surface 106a. Surface 106a can be a distinct assembly or part of a piece of manufacturing equipment 106b adapted to include surface 106a. Manufacturing equipment 106b can be a machine for manufacturing the component measured with apparatus 100. Manufacturing equipment 106b can be, e.g., a lathe tool post for machining dovetail protrusion 50, or a specially designed stand integrated with other devices for manufacturing dovetail protrusion 50. In the case of a lathe tool post, surface 106a can engage one of several tool-mounting interfaces (not shown) of the tool post. Surface 106a can also be attachable to and detachable from specialized equipment for installing apparatus 100 in order to measure several components in succession. As apparatus 100 operates, the measured component (e.g., dovetail protrusion 50) can be positioned within a manufacturing lathe or on a rotary device which includes manufacturing equipment 106b and can rotate the component to several rotational positions. In other embodiments discussed herein, laser assembly 102 can be mounted on or directly coupled to the component being measured (e.g., dovetail protrusion 50) and/or a track affixed thereto.

A user can move laser assembly 102 across track 104 by any desired technique of imparting a force, e.g., by sliding laser assembly 102 across track 104 during measurement. If desired, apparatus 100 can also include an actuator 107 coupled to surface 106a. Actuator 107 can automatically impart a predetermined amount of force onto laser assembly 102 by use of any currently known or later developed actuating tool. For example, actuator 107 can include an electric motor, a hydraulic actuator, a pneumatic actuator, a gear system, etc. The force imparted from actuator 107 can be sufficient to move laser assembly 102 at a predetermined, constant speed for measuring exterior surface 52 of dovetail protrusion 50. Actuator 107 can move laser assembly 102 in a particular direction, e.g., backward or forward substantially along line A.

Laser assembly 102 can include a first light source 108 for emitting a first laser beam 110 onto an exterior surface 52 of a component (e.g., dovetail protrusion 50). Exterior surface 52 may have been machined to create a particular geometrical profile thereon. Embodiments of apparatus 100 can allow a user to model exterior surface 52 and/or determine whether the profile of exterior surface 52 is within a tolerance limit for the manufactured component, as discussed in detail elsewhere herein. The tolerance limits used for comparison may include, e.g., a manufacturing tolerance of dimensions for dovetail protrusion 50 stored in the memory of a computer system. Exterior surface 52 can reflect first laser beam 110 back to laser assembly 102, where a first laser encoder 112 can receive and detect first laser beam 110.

Laser assembly 102 can also include a positional encoder 113. Positional encoder 113 can be a distinct component in contact with track 104 and capable of detecting the position of laser assembly 102 along track 104. In an alternative embodiment, positional encoder 113 can be contained within the same housing as first light source 108. Positional encoder can be any type of tool or self-contained measuring system, e.g., a linear encoder, capable of deriving its current location in space by reference to a particular point or axis. Positional encoder 113 can be based on optical, magnetic, capacitive, and/or image based systems for determining a position. Some embodiments of laser assembly 102 can mimic the function of positional encoder 113 by reference to measurements received over a given time period as an approximation of position relative to a predetermined speed or velocity profile.

Laser assembly 102 (including first laser encoder 112 and/or positional encoder 113) can be coupled to a computer system 114 through any currently known or later developed type of data coupling 116, e.g., a bus or wireless data exchange protocol. It is also understood, as described elsewhere herein, that computer system 114 can be in the form of multiple interconnected devices. Computer system 114 can be configured (e.g., through internally or externally stored instructions) to render a geometric profile of exterior surface 52 based on the laser beams detected with first laser encoder 112 and the position data obtained from positional encoder 113. Computer system 114 can use a variety of methods, e.g., interferometry, laser-scanning vibrometry, and/or stroboscopic techniques, to measure exterior surface 52 of components such as dovetail protrusion 50. Generally, these techniques allow a component which receives a reflected laser to determine the position of a component or material which reflected the laser, when the laser's origin is known, based on changes to the laser's wave properties (e.g., changes in velocity, frequency, and wavelength determined by superposition) or physical effects of the component (e.g., produced vibrations) detected with laser assembly 102.

In the case of dovetail protrusion 50, computer system 114 can measure a line width W and/or track height H of dovetail protrusion 50 from its corresponding turbine wheel 18 (FIG. 1). As a result, apparatus 100 can act as a measuring machine in a variety of settings (e.g., a manufacture environment) to model a geometric profile of exterior surface 52 without contacting dovetail protrusion 50. To store comparative modeling data for components such as dovetail protrusion 50, apparatus 100 can be calibrated by measuring a model of the component. Data for the model can be stored within computer system 114 (e.g., within memory) as a "tolerance profile." In the event that the measured component is in the form of dovetail protrusion 50, computer system 114 can also identify critical assembly mating surfaces on exterior surface 52. Crushing surfaces on exterior surface 52 can be identified by any method for detecting one or more flat regions of exterior surface 52, e.g., by marking "waypoints" according to methods of the present disclosure. A crushing surface generally refers to a typically flat area or region of dovetail protrusion 50 for contacting corresponding flat areas of a bucket (e.g., blade 20 (FIGS. 1, 2)).

Laser assembly 102 can include a first mirror 118 for reflecting lasers from first light source 108 onto exterior surface 52 of dovetail protrusion 50, and/or for reflecting lasers from exterior surface 52 of dovetail protrusion 50 onto first laser encoder 112. First mirror 118 can be mounted on laser assembly 102, which in turn can be slidably coupled to track 104, such that first mirror 118 can slide relative to dovetail protrusion 50 as laser assembly 102 moves. First mirror 118 can rotate by use of any rotatable connection, such as a rotatable coupling between first mirror 118 and laser assembly 102. First mirror 118 can be rotatable about a particular axis, e.g., axis Y of FIG. 3, to adjust the reflection of first laser 110. In addition, actuator 107 can provide a rotating force by being coupled to first mirror 118, or a separate actuator (not shown) can be coupled to first mirror 118 for this purpose.

Figure 4:
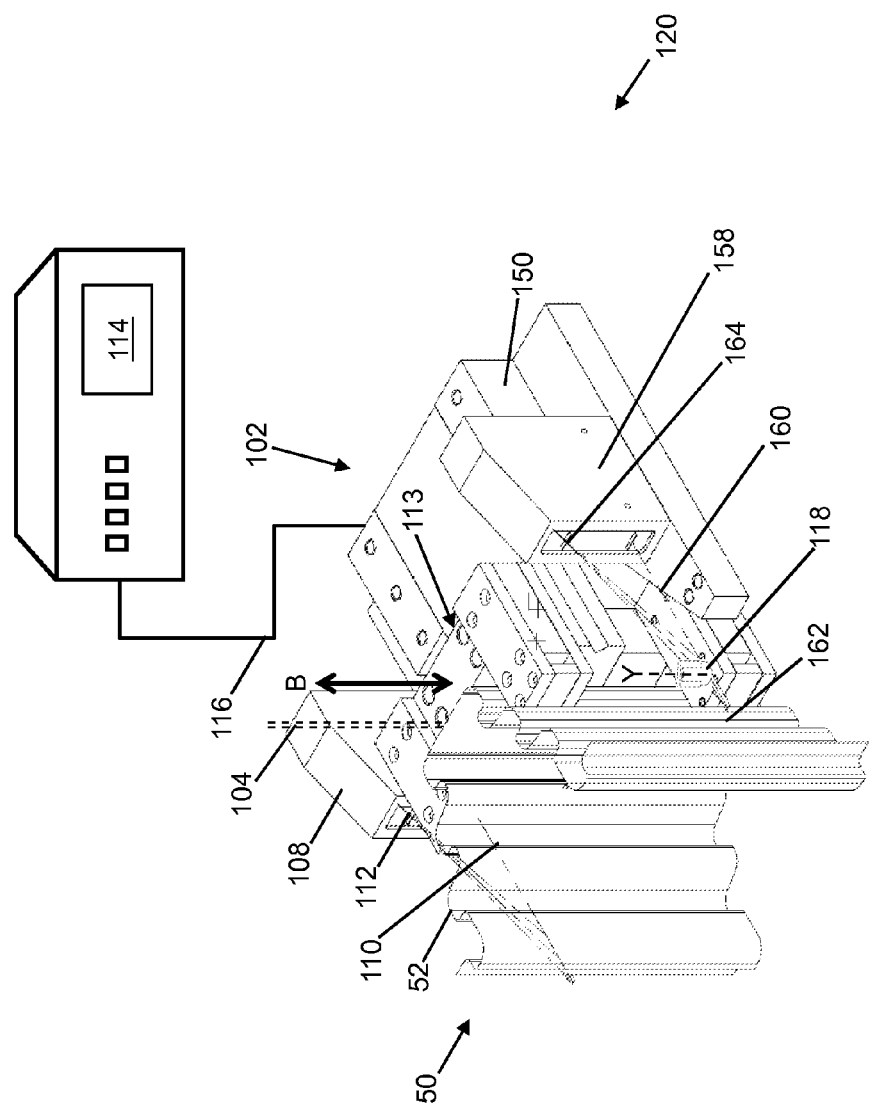
FIG. 4 is a perspective illustration of an alternative apparatus according to an embodiment of the present disclosure.

Turning to FIG. 4, another apparatus 120 with laser assembly 102 is shown. In one such alternative embodiment, laser assembly 102 can measure several exterior surfaces 52, 162 of dovetail protrusion 50 simultaneously. Laser assembly 102 can include a support structure 150 slidably coupled to track 104, with first light source 108 and a second light source 158 being mounted thereon. Apparatus 120 can be attached directly to dovetail protrusion 50 and/or track 104 on the surface of dovetail protrusion 50 such that apparatus 120 can move substantially along the direction of arrow B. Second light source 158 can emit a second laser beam 160 onto an exterior surface 162 of dovetail protrusion 50. Laser assembly 102 can receive the reflected second laser beam 160 in a second laser encoder 164. Each laser 110, 160, can be reflected from rotatable mirror 118 to model different portions of external surfaces 52, 162. First and second laser encoders 112 (FIG. 3), 164 can alternatively be part of a single laser encoder device, with two points of detection in place of first and second laser encoders 112 (FIG. 3), 164. It is therefore understood that computer system 114 can receive separate inputs from first and second laser encoders 112 (FIG. 3), 164 or receive a single input from a combined laser encoding device (not shown) in laser assembly 102. The position of first and second light sources 108, 158 on support structure 150 can substantially align first and second light sources 108, 158 with exterior surfaces 52, 162 of dovetail protrusion 50. As used herein, the terms "substantial alignment" and its equivalents can include any alignment through which first and/or second light sources 108, 158 can emit first and/or second laser beams 110, 160 onto one or more exterior surfaces 52, 162 of dovetail protrusion 50. Furthermore, "substantial alignment" and its equivalents can include any alignment in which first and/or second laser encoders 112 (FIG. 3), 164 can detect reflected first and/or second laser beams 110, 160.

Computer system 114 can obtain data from data coupling 116 to first and/or second laser encoders 112 (FIG. 3), 164, positional encoder 113, and/or a combined data port located on support structure 150, as shown in FIG. 4. Where computer system 114 obtains data from first and second laser encoders 112 (FIG. 3), 164, computer system 114 can model a geometric profile of two or more exterior surfaces 52, 164. It is further understood that computer system 114 can model an even larger number of detected laser beams, and that laser assembly 102 can similarly be modified to include more than two light sources and laser encoders where dovetail protrusion 50 includes multiple exterior surfaces to be modeled.

Figure 5:
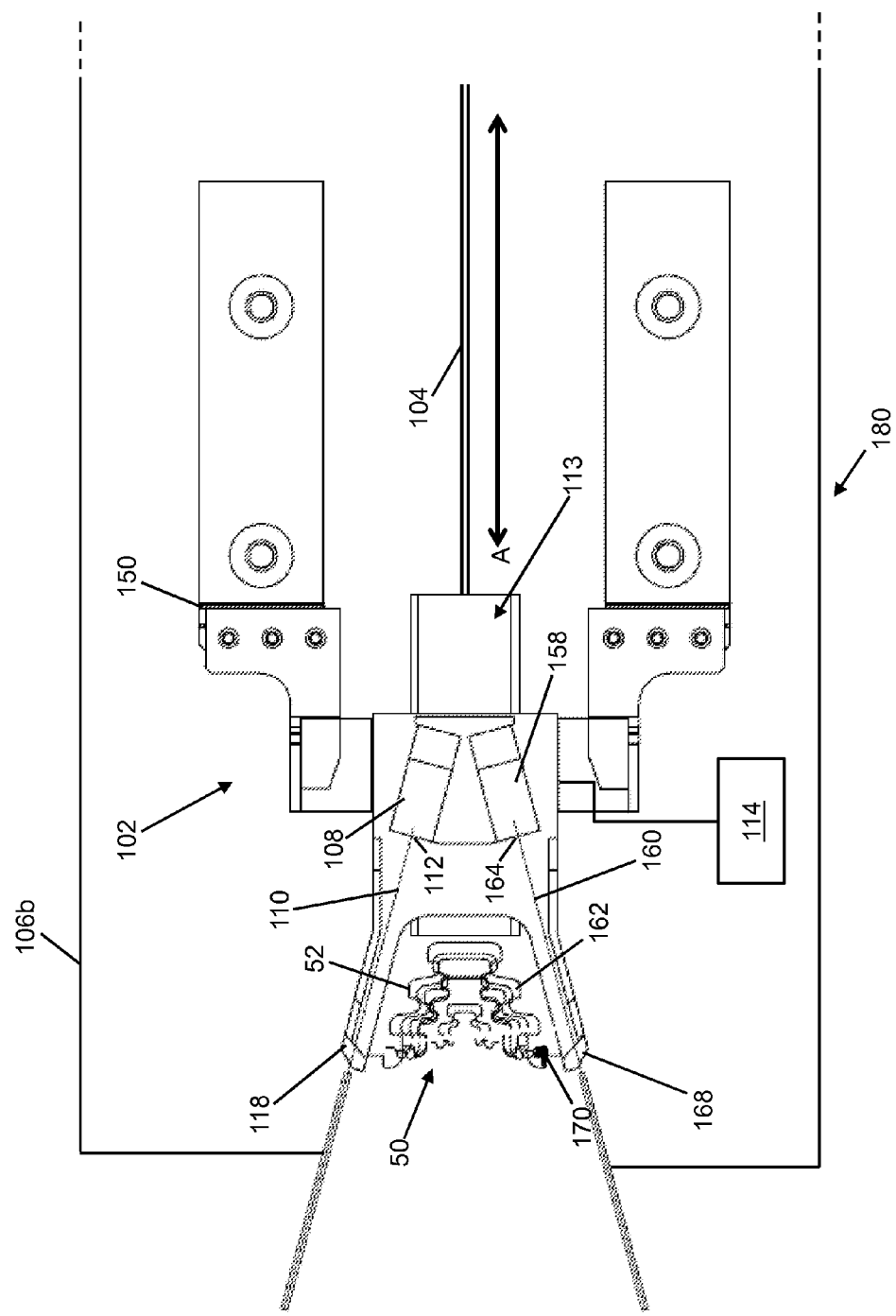
FIG. 5 is a top-down illustration of another alternative apparatus according to an embodiment of the present disclosure.

Turning to FIG. 5, another alternative embodiment of the present disclosure including an apparatus 180 and laser assembly 102 is shown. Support structure 150 of laser assembly 102 can include first mirror 118 and a second mirror 168 positioned thereon. First mirror 118 can be substantially aligned with first light source 108, exterior surface 52, and laser encoder 112, thereby allowing first laser beam 110 to reflect from exterior surface 52 and be detected with laser encoder 112. Second mirror 168 can be substantially aligned with second light source 158, exterior surface 162, and laser encoder 164, thereby allowing first laser beam 160 to reflect from exterior surface 162 and be detected with laser encoder 164. Support structure 150 with first and second light sources 108, 158 can be slidably coupled to track 104 and capable of moving substantially along the direction of arrow A. As laser assembly 102 moves along track 104, apparatus 180 can continuously measure exterior surfaces 52, 162 of dovetail protrusion 50 by use of first and second laser encoders 112, 164.

Figure 6:
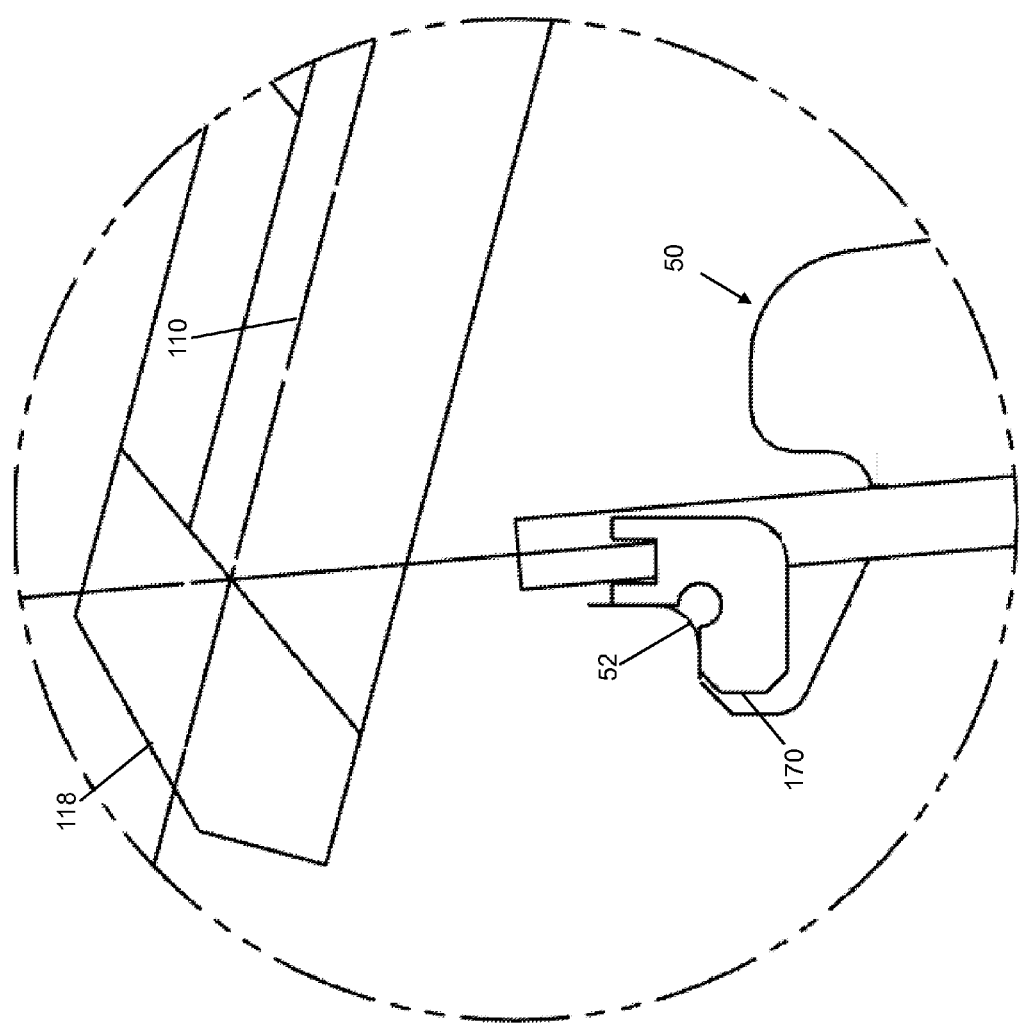
FIG. 6 is a top-down illustration of a mirror, component, and reflective positional adapter according to an embodiment of the present disclosure.

Referring to FIGS. 5 and 6 together, exterior surfaces 52, 162 of dovetail protrusion 50 may include surfaces outside the detectable range of laser assembly 102. A reflective positional adapter 170 can be positioned on exterior surfaces 52, 162 of dovetail protrusion 50 such that part of reflective positional adapter 170 is within the detectable range of laser assembly 102. Reflective positional adapter 170 can be made of a material capable of reflecting lasers back to apparatuses of the present disclosure. Reflective positional adapter 170 can contact these undetectable regions, and reflect first and/or second laser beams 110, 160. The shape and position of reflective positional adapter 170 can be predetermined and stored in computer system 114. Computer system 114 can derive the dimensions of undetectable regions from the stored properties of reflective positional adapter 170. Reflective positional adapter 170 can reflect laser beams 110, 160 from first or second light sources 108, 158 into laser encoders 112, 164. A user can calibrate computer system 114 to identify that reflective positional adapter 170 is positioned on a predetermined location of the measured component.

Figure 7:
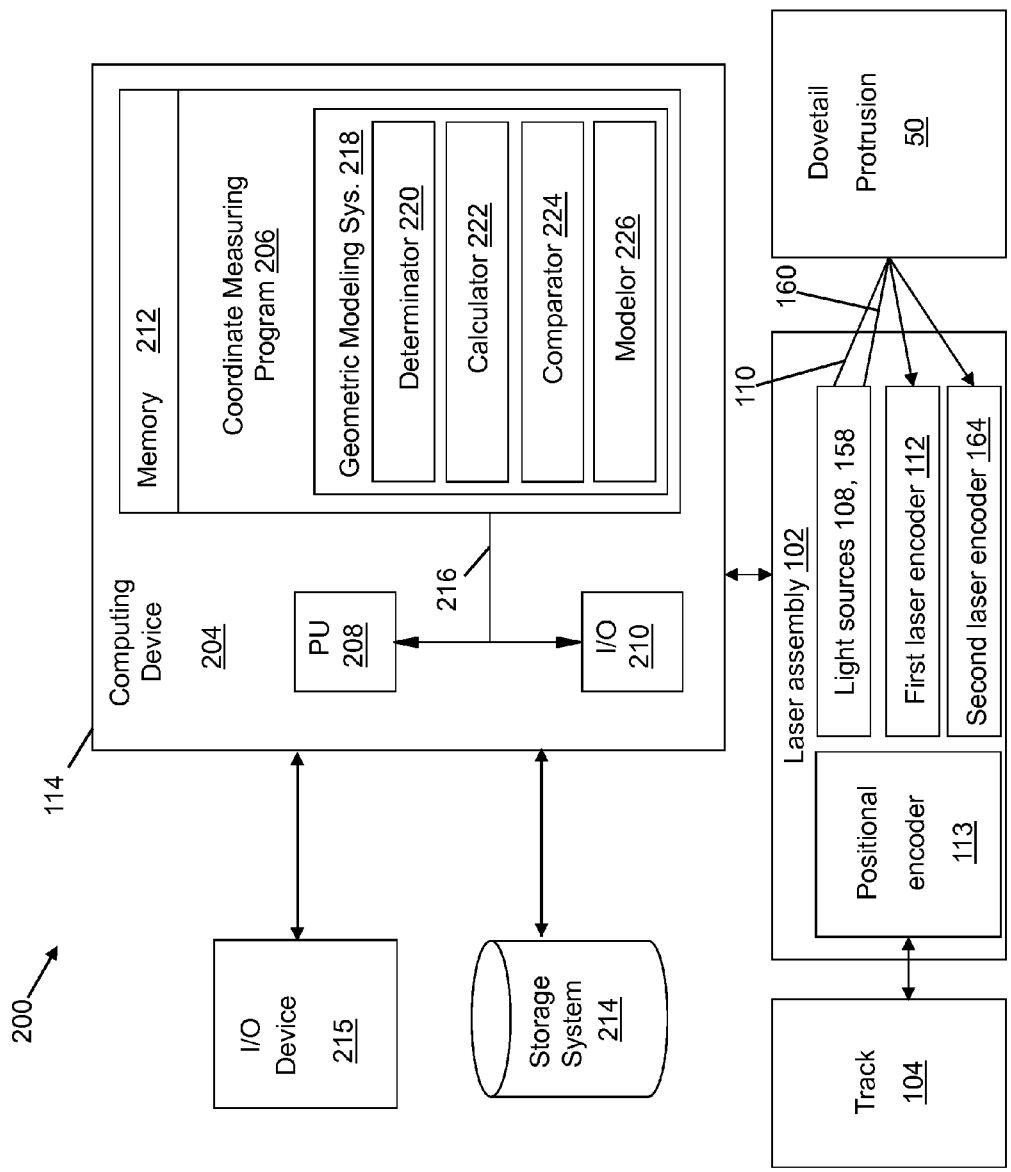
FIG. 7 is an illustrative environment of a computer system coupled to a laser assembly according to an embodiment of the present disclosure.

Turning now to FIG. 7, an illustrative environment 200 for implementing methods described herein is shown. Embodiments of the present disclosure may be coded as a set of instructions on removable or hard media for use by a general-purpose computer, and thus may, in embodiments, include a computer program product. FIG. 6 FIG. 7 is also a schematic block diagram of a general-purpose computer for practicing the present invention. In particular, a computer system 114 is shown as including a computing device 204. Computing device 204 can include a coordinate measuring program 206, which can measure the coordinates of a component by performing any/all of the processes described herein and implementing any/all of the embodiments described herein.

Computer system 114 is shown including a processing unit 208 (e.g., one or more processors), an I/O component 210, a memory 212 (e.g., a storage hierarchy), an external storage system 214, an input/output (I/O) device 215 (e.g., one or more I/O interfaces and/or devices), and a communications pathway 216. In general, processing unit 208 can execute program code, such as coordinate measuring program 206, which is at least partially fixed in memory 212. While executing program code, processing unit 208 can process data, which can result in reading and/or writing transformed data from/to memory 212 and/or I/O device 215 for further processing. Pathway 216 provides a communications link between each of the components in environment 200. I/O component 210 can comprise one or more human I/O devices, which enable a human user to interact with computer system 114 and/or one or more communications devices to enable a system user to communicate with the computer system 114 using any type of communications link. To this extent, coordinate measuring program 206 can manage a set of interfaces (e.g., graphical user interface(s), application program interface(s), etc.) that enable human and/or system users to interact with coordinate measuring program 206. Further, coordinate measuring program 206 can manage (e.g., store, retrieve, create, manipulate, organize, present, etc.) data, through several modules contained within a geometric modeling system 218.

In any event, computer system 114 can comprise one or more general purpose computing articles of manufacture (e.g., computing devices 204) capable of executing program code, such as coordinate measuring program 206, installed thereon. As used herein, it is understood that "program code" means any collection of instructions, in any language, code, or notation, that cause a computing device having an information processing capability to perform a particular function either directly or after any combination of the following: (a) conversion to another language, code or notation; (b) reproduction in a different material form; and/or (c) decompression. To this extent, coordinate measuring program 206 can be embodied as any combination of system software and/or application software.

Further, coordinate measuring program 206 can include a geometric modeling system 218. In this case, various modules of geometric modeling system 218 can enable computer system 114 to perform a set of tasks used by coordinate measuring program 206, and can be separately developed and/or implemented apart from other portions of coordinate measuring program 206. As used herein, the term "component" means any configuration of hardware, with or without software, which implements the functionality described in conjunction therewith using any solution, while the term "module" means program code that enables computer system 114 to implement the functionality described in conjunction therewith using any solution. When fixed in memory 212 of computing device 204 which includes processing unit 208, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of computing device 204.

Several modules of geometric modeling system 218 are shown in FIG. 7 by way of example. A determinator module 220 can issue instructions, commands, etc. based on data stored within memory 212 of computing device 204, or other pieces of information provided thereto. A calculator module 222 can perform mathematical computations, a comparator module 224 can compare two or more data quantities, and a modelor module 226 can add or subtract variables to/from or otherwise adjust generated models. Each module discussed herein can obtain and/or operate on data from exterior components, units, systems, etc. or from memory 212 of computing device 204. In a particular example, the data provided to geometric modeling system 218 of coordinate measuring program 206 can be obtained from, e.g., first and/or second laser encoders 112, 164 of laser assembly 102. As discussed herein, parts of laser assembly 102 can be substantially aligned with dovetail protrusion 50 such that first and second laser encoders 112, 164 detect laser beams, signals, etc. reflected therefrom. In addition, position data obtained from positional encoder 113 (e.g., moving across track 104) can be matched with data obtained from first and/or second laser encoders 112, 164 and provided to geometric modeling system 218.

Where computer system 114 comprises multiple computing devices, each computing device may have only a portion of coordinate measuring program 206 and/or geometric modeling system 218 fixed thereon (e.g., one or more modules). However, it is understood that computer system 114 and coordinate measuring program 206 are only representative of various possible equivalent computer systems that may perform a process described herein. To this extent, in other embodiments, the functionality provided by computer system 114 and coordinate measuring program 206 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 114 includes multiple computing devices, the computing devices can communicate over any type of communications link. Further, while performing a process described herein, computer system 114 can communicate with one or more other computer systems using any type of communications link. In either case, the communications link can comprise any combination of various types of wired and/or wireless links; comprise any combination of one or more types of networks; and/or use any combination of various types of transmission techniques and protocols. Computer system 114 can obtain or provide data, such as data stored in storage system 214, using any solution. For example, computer system 114 can generate and/or be used to generate data from one or more data stores, receive data from another system, send data to another system, etc.

While shown and described herein as a method and system for non-contact coordinate measuring of components such as dovetail protrusion 50, it is understood that aspects of the invention further provide various alternative embodiments. For example, in one embodiment, the invention provides a computer program fixed in at least one computer-readable storage medium, which when executed, enables non-contact coordinate measurement of a component by use of reflected laser beams. To this extent, the computer-readable storage medium includes program code, such as coordinate measuring program 206, which implements some or all of the processes and/or embodiments described herein. It is understood that the term "computer-readable storage medium" comprises one or more of any type of tangible medium of expression, now known or later developed, from which a copy of the program code can be perceived, reproduced, or otherwise communicated by a computing device. For example, the computer-readable storage medium can comprise: one or more portable storage articles of manufacture; one or more memory/storage components of a computing device; paper; etc.

In another embodiment, the invention provides a method of providing a copy of program code, such as coordinate measuring program 206, which implements some or all of the processes described herein. In this case, a computer system can process a copy of program code that implements some or all of the processes described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable storage medium. In either case, the set of data signals can be transmitted/received using any type of communications link.

In still another embodiment, the invention provides a method of generating a system for non-contact coordinate measurement. In this case, a computer system, such as computer system 114, can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

Figure 8:
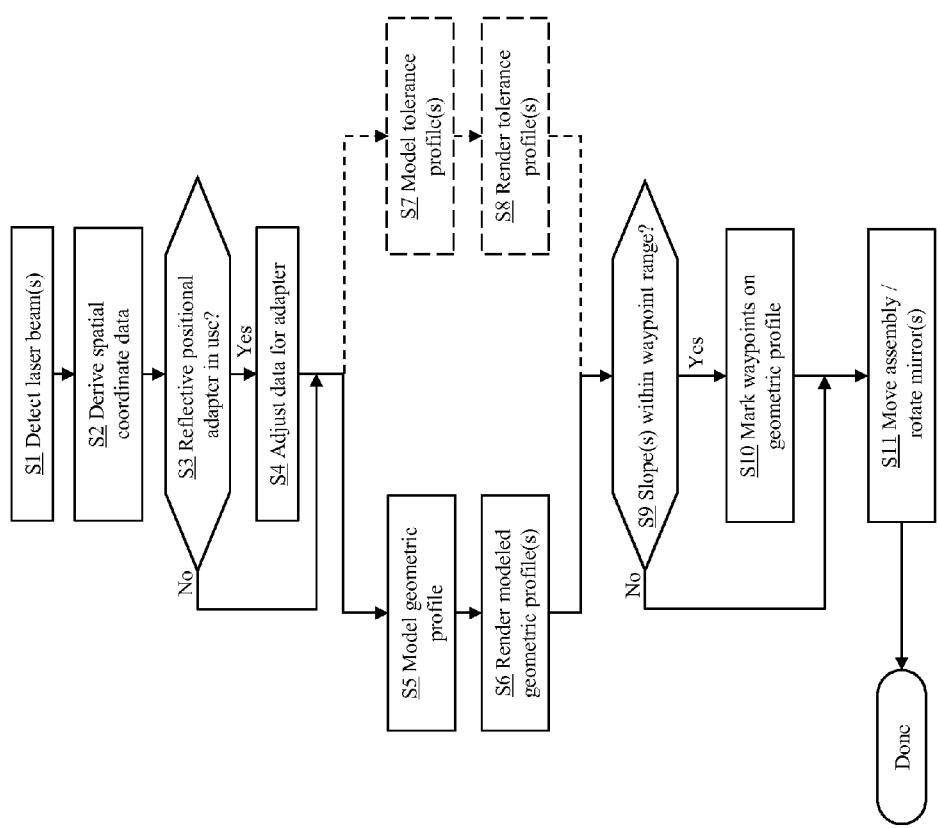
FIG. 8 is an example flow diagram of a method according to embodiments of the present disclosure.

FIG. 8 shows an illustrative flow diagram according to an embodiment of the present disclosure. These steps are summarized with reference to FIGS. 7 and 8 together. In step S1, first and/or second laser encoders 112,164 can detect first and/or second laser beams 110,160 reflected from the surface of dovetail protrusion 50. The laser beams detected in step S1 can be emitted from first and/or second light sources 108 (FIGS. 3-5), 158 (FIGS. 4-5), which may in turn be positioned on laser assembly 102 (FIGS. 3-5) slidably coupled to track 104 (FIGS. 3-5). Laser assembly 102 (FIGS. 3-5) and/or track 104 (FIGS. 3-5) may in turn be coupled to or mounted on a machine for manufacturing dovetail protrusion 50 or another component to be measured. One example type of manufacturing device for holding track 104 is the tool post of a lathe. Although methods according to the present disclosure are described with reference to coordinate measuring of dovetail protrusion 50, the process steps discussed herein can also be applied to measuring and modeling the geometric profile other components such as a horizontal joint cage or a generator rotor of a particular assembly, such as turbine 10 (FIG. 1).

In step S2, calculator 222 can derive spatial coordinate data from the laser beams detected in laser encoders 114,162 and the data received from positional encoder 113. Methods by which calculator 222 can derive spatial coordinate data from laser encoders 114, 162 may include, e.g., interferometry, laser-scanning vibrometry, and/or stroboscopic techniques. Generally, these techniques allow a component which receives a reflected laser to determine the position of a component or material which reflected the laser, when the laser's origin is known, based on changes to the laser's wave properties (e.g., changes in velocity, frequency, and wavelength determined by superposition) or physical effects of the component (e.g., produced vibrations) detected with laser assembly 102. The spatial coordinate data derived in step S2 can be stored in memory 212 and/or storage system 214, and may be in the form of coordinate data for a particular dovetail protrusion 50. Calculator 222 can derive spatial coordinate data in real time as laser assembly 102 (FIGS. 3-5) moves across track 104 (FIGS. 3-5).

In step S3, determinator 220 can determine whether reflective positional adapter(s) 170 (FIGS. 5, 6) are coupled to dovetail protrusion 50 as noted with the corresponding phantom line. A user can instruct coordinate measuring program 206 to adjust particular sets of data in response to the location of reflective positional adapter(s) 170. Where reflective positional adapter(s) 170 (FIG. 5, 6) are not present, i.e., "no" at S3, the method can continue to further steps with the derived spatial coordinate data of dovetail protrusion 50. Where reflective positional adapter 170 (FIGS. 5, 6) is present, i.e., "yes" at S3, calculator 222 can adjust the spatial coordinate data in step S4 to account for the detected or predetermined position of reflective positional adapter 170 (FIGS. 5, 6). With reflective positional adapter 170, computing device 202 can model areas of dovetail protrusion 50 outside the range of laser assembly 102. For example, calculator 222 can subtract the known dimensions of reflective positional adapter 170 from the measured surface(s) of the component to derive a geometric profile which includes surfaces outside the range of laser assembly 102.

Methods of the present disclosure can include displaying the derived spatial coordinate data in the form of a geometric profile of dovetail protrusion 50 or another component under examination. In step S5, modelor 226 can model a geometric profile from the spatial coordinate data derived in step S2 (including any adjustments from step S4). The geometric profile modeled in step S5 can be modified with user inputs to computing device 114, and for example can include two-dimensional or three-dimensional plots of the recorded spatial coordinate data. To display the geometric profile to a user, modelor 226 can render a virtual display of the geometric profile with the aid of, e.g., graphics processing hardware and/or I/O device 215. If desired, the geometric profiles modeled in step S5 can be stored in memory 212 and/or storage device 214 after being rendered in step S6.

In the event that one laser assembly 102 (FIGS. 3-5) includes multiple light sources 108, 158 and laser encoders 112, 164, modeling the geometric profile in step S5 can include combining data for several modeled sections of dovetail protrusion 50 into a single geometric profile. For example, where first and second laser encoders 112, 164 detect laser beams from external surfaces 52 (FIGS. 3-6), 162 (FIGS. 4-5), respectively, the spatial coordinate data derived from each laser beam 110, 160 can be combined into a single geometric profile in step S5, which can be rendered in step S6. It is understood that a single geometric profile can be derived from more than two laser encoders, as may be seen in different embodiments of laser assembly 102 (FIGS. 3-5).

Methods of the present disclosure can also include comparing the geometric profile(s) modeled and rendered in steps S5, S6 with a predetermined "tolerance profile" for the exterior surface(s) 52 (FIGS. 3-6), 162 (FIGS. 4-5) of dovetail protrusion 50. The tolerance profile can represent an ideal manufacturing quality condition or range of manufacturing quality conditions. The tolerance profile can be uploaded to computer system 114 as predetermined data, or can be determined in a "calibration" setting by measuring a model component with apparatus 100, 120, 180 (FIGS. 3-5). As used herein, the term "calibration" can refer to the measuring of a known component (e.g., a model dovetail protrusion 50) against which other measured components are compared and analyzed. Comparing the geometric profile(s) with one or more tolerance profiles can display whether a particular manufactured component meets quality standards. After deriving spatial coordinate data in step S2, modelor 226 can also model a tolerance profile based on predetermined manufacturing tolerances for dovetail protrusion 50. As dovetail protrusion 50 is configured for mating engagement with other surfaces of an assembly, the modeled tolerance profile can represent maximum and/or minimum values of particular dimensions, such as line width W (FIG. 3) and track height H (FIG. 3). Modelor 226 can also render the tolerance profile for dovetail protrusion 50 in step S8. Steps S7 and S8 are illustrated in phantom as optional steps, and may be executed either sequentially or simultaneously with steps S5 and S6. In any event, the rendered tolerance profile(s) and geometric profile(s) can be displayed simultaneously to provide a visual indication of whether a particular dovetail protrusion satisfies quality standards reflected in the tolerance profile(s). A user can then determine, based on the simultaneous display or superposition of the geometric profile(s) with the tolerance profile(s), whether the measured component meets particular quality standards. The user can obtain this visual indication of the component's quality without physically contacting the component by using laser assembly 102.

Methods according to the present disclosure can also include identifying particular features of dovetail protrusion 50, such as crushing surfaces. As described elsewhere herein, a crushing surface refers to a typically flat area or region of dovetail protrusion 50 for contacting corresponding flat areas of a bucket. After modelor 226 renders geometric profile(s) in step S6, and optionally renders tolerance profile(s) in step S8, comparator 224 can compare the modeled geometric profile(s) with particular values of slope at various points of the geometric profile with a predetermined waypoint range of slope values. To identify crushing surfaces, the waypoint range can include values of slope approximately equal to zero. Since crushing surfaces of dovetail protrusion 50 are generally flat sections, the measured slope throughout a particular region will be substantially equal to zero. Slope values within the geometric profile can be determined by any mathematical technique, e.g., taking the derivative of points within the mathematical model of the geometric profile with respect to a particular reference axis.

In the event that comparator 224 finds no values of slope within the waypoint range, the method can continue to further steps. Alternatively, modelor 226 can mark, highlight, log, etc. all regions of the geometric profile within the waypoint range shown with comparator 224. Depending on how the waypoint range is defined, the marked waypoints may correspond to particular areas of interest on dovetail protrusion 50. The marked waypoints can identify the various crushing surfaces located on dovetail protrusion 50. As a result, a user can determine whether a set of waypoints for the component being measured meet particular criteria. In embodiments of the present disclosure, identifying waypoints on the component can occur automatically after modeling the geometrical profile of the component. The identified waypoints can be displayed simultaneously with the rendered geometric profile or can be shown separately, e.g., within a spreadsheet or table.

Methods of the present disclosure can also include coordinate measuring program 206 instructing mechanical components of apparatus 100 (FIG. 3) (e.g., actuator 107 (FIG. 3)) in step S11 to move laser assembly 102 (FIGS. 3-5) or rotate first and/or second mirrors 118 (FIGS. 3, 5), 168 (FIG. 5) to particular positions. Coordinate measuring program 206 can instruct components of apparatus 100 (FIG. 3) to move based on the modeled geometric profile(s) being incomplete, and/or a user gathering more data for dovetail protrusion 50. Following the steps illustrated in FIG. 7, processes of the present disclosure can terminate and/or repeat to model other components, e.g., other dovetail protrusions 50.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "configured," "configured to," and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

The embodiments of apparatuses discussed in this disclosure can offer several technical and commercial advantages, some of which are discussed by way of example. Embodiments of the present disclosure provide a non-contact system, apparatus, and program product for coordinate measuring of components, including dovetail protrusions used in a turbine system or assembly. Furthermore, the embodiments discussed herein can be coupled to a manufacturing device, e.g., a lathe, for producing the components measured with embodiments of the present disclosure. By modeling a geometric profile of a component during or after the manufacture of a component, a manufacturer can identify quality errors more quickly than may be possible with contact-based coordinate measuring machines.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:
    a laser assembly slidably coupled to a track and configured to emit:
        a first laser beam onto a first exterior surface of a component,
        a second laser beam onto a second exterior surface of the component, wherein the track is coupled to one of the component and a machine for manufacturing the component, and
        wherein the laser assembly includes:
            a light source configured to emit the first laser beam; and
            a rotatable mirror substantially aligned with the light source, wherein the rotatable mirror is configured to reflect the first laser beam from the light source onto an exterior surface of the component and reflect the first laser beam from the exterior surface of the component into a laser encoder, and wherein the rotatable mirror is rotatable about a single axis;
    a positional encoder configured to detect the position of the laser assembly;
    the laser encoder configured to detect:
        the first laser beam emitted from the laser assembly and reflected from the first exterior surface of the component, and
        the second laser beam emitted from the laser assembly and reflected from the second exterior surface of the component; and
    a computer system coupled to the laser encoder and the positional encoder configured to render a geometric profile of the first exterior surface and the second exterior surface of the component based on the position of the laser assembly and the first laser beam and the second laser beam detected with the laser encoder.

2. The apparatus of claim 1, wherein the computer system is further configured to identify a crushing surface of the component based on the rendered geometric profile.

3. The apparatus of claim 1, further comprising an actuator configured to slide the laser assembly across the track at a predetermined speed.

4. The apparatus of claim 1, wherein the laser assembly further includes:
    a support structure slidably coupled to the track and configured to substantially align the laser assembly with two exterior surfaces of the component; and
    a first light source coupled to the support structure and configured to emit the first laser beam;
    a second light source coupled to the support structure and configured to emit the second laser beam;
    wherein the laser encoder is further configured to detect the first and second laser beams originating from the first light source and the second light source, and
    wherein the first light source and the second light source are located on opposite sides of the component.

5. The apparatus of claim 4, further comprising:
    a first mirror coupled to the support structure and substantially aligned with the first light source; and
    a second mirror coupled to the support structure and substantially aligned with the second light source;
    wherein each of the first mirror and the second mirror are configured to reflect the first and second laser beams onto one of the two exterior surfaces of the component, and further reflect the first and second laser beams reflected from one of the two exterior surfaces of the component into the laser encoder.

6. The apparatus of claim 1, wherein the computer system is further configured to indicate whether the geometric profile exceeds a tolerance profile for the component.

7. The apparatus of claim 1, wherein the laser assembly is further configured to direct the first laser beam onto a reflective positional adapter positioned on the exterior surface of the component, wherein the reflective positional adapter contacts a surface of the component outside a detectable range of the laser assembly, and is configured to reflect the first laser beam.

8. The apparatus of claim 1, wherein the component comprises a dovetail protrusion from a turbine wheel from a turbine wheel.

9. The apparatus of claim 8, wherein the geometric profile further includes a line width and a track height of the dovetail protrusion from the turbine wheel.

10. A computer-program product stored on a non-transitory computer readable storage device, the program product operative to measure coordinates when executed, the computer readable storage device comprising program code for:
rotating a first rotatable mirror to direct a first laser beam onto a first section of an exterior surface of a component, wherein the first rotatable mirror is rotatable around a single axis;
rotating a second rotatable mirror to direct a second laser beam onto a second section of the exterior surface of the component;
deriving spatial coordinate data from positional encoder data and the first and second laser beams simultaneously, the first laser beam having been reflected from the first section of the exterior surface of the component, and the second laser beam having been reflected from the second section of the exterior surface of the component, and the first and second lasers having been emitted from a slidably moveable source coupled to one of the component and a machine for manufacturing the component;
modeling a geometric profile of the first and second section of the exterior surface of the component based on the derived spatial coordinate data; and
rendering the modeled geometric profile.

11. The non-transitory computer-program product of claim 10, wherein the modeling of the geometric profile of the exterior surface of the component includes modeling the geometric profile of a dovetail protrusion from a turbine wheel.

12. The non-transitory computer-program product of claim 10, further comprising program code for modeling a tolerance profile of the exterior surface of the component, wherein the rendering further includes rendering the tolerance profile simultaneously with the modeled geometric profile.

13. The non-transitory computer-program product of claim 10, further comprising program code for deriving spatial coordinate data from detected laser beams reflected from a reflective positional adapter coupled to the exterior surface of the component.

14. The non-transitory computer-program product of claim 13, further comprising program code for determining whether a detected laser beam is reflected from the reflective positional adapter or the exterior surface of the component.

15. The non-transitory computer-program product of claim 10, further comprising program code for:
detecting whether the modeled geometric profile includes a section having a slope value within a waypoint range; and
marking a plurality of waypoints within the modeled geometric profile corresponding to each section detected as being within the waypoint range.

16. The non-transitory computer-program product of claim 10, further comprising program code for combining a plurality of modeled geometric profiles, wherein each of the plurality of modeled geometric profiles depict respective sections of the exterior surface of the component.

17. The non-transitory computer-program product of claim 10, wherein the deriving of the spatial coordinate data includes detecting the first and second laser beams with a single laser encoder.

18. A system comprising:
a laser assembly slidably coupled to a track and configured to direct:
a first laser beam onto a first exterior surface of a component; and
a second laser beam onto a second exterior surface of the component, wherein the track is coupled to one of the component and a machine for manufacturing the component and
wherein the laser assembly includes:
a light source configured to emit the first laser beam; and
a rotatable mirror substantially aligned with the light source, wherein the rotatable mirror is configured to reflect the first laser beam from the light source onto an exterior surface of the component and reflect the first laser beam from the exterior surface of the component into a laser encoder, and wherein the rotatable mirror is rotatable about a single axis;
a positional encoder configured to detect the position of the laser assembly;
the laser encoder configured to detect:
the first laser beam directed from the laser assembly and reflected from the first exterior surface of the component, and
the second laser beam emitted from the laser assembly and reflected from the second exterior surface of the component; and
a computer system coupled to the laser encoder and positional encoder and configured to render a geometric profile of the first exterior surface and the second exterior surface of the component based on the position of the laser assembly and the first laser beam and the second laser beam detected with the laser encoder by performing actions including:
deriving spatial coordinate data from the first and second laser beams, the first laser beam having been reflected from the first exterior surface of the component, and the second laser beam having been reflected from the second exterior surface of the component;
modeling a geometric profile of the exterior surface of the component based on the derived spatial coordinate data and the detected position of the laser assembly; and
rendering the modeled geometric profile.

19. The system of claim 18, wherein the component comprises a dovetail protrusion from a turbine wheel.

* * * * *